US012499848B2

(12) United States Patent
Lee

(10) Patent No.: US 12,499,848 B2
(45) Date of Patent: Dec. 16, 2025

(54) DISPLAY DEVICE AND METHOD FOR CONTROLLING LEDS OF BACKLIGHT PANEL

(71) Applicant: SAMSUNG ELECTRONICS CO., LTD., Suwon-si (KR)

(72) Inventor: Minhoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/891,318

(22) Filed: Sep. 20, 2024

(65) Prior Publication Data

US 2025/0014528 A1 Jan. 9, 2025

Related U.S. Application Data

(63) Continuation of application No. 17/980,939, filed on Nov. 4, 2022, now Pat. No. 12,100,362, which is a (Continued)

(30) Foreign Application Priority Data

Jan. 14, 2022 (KR) ........................ 10-2022-0006130

(51) Int. Cl.
*G09G 3/30* (2006.01)
*G09G 3/32* (2016.01)
*G09G 3/34* (2006.01)

(52) U.S. Cl.
CPC ............. *G09G 3/3426* (2013.01); *G09G 3/32* (2013.01); *G09G 2310/0213* (2013.01); (Continued)

(58) Field of Classification Search
CPC ............. G09G 3/32; G09G 2310/0213; G09G 2310/0267; G09G 2310/08; (Continued)

(56) References Cited

U.S. PATENT DOCUMENTS 8,599,183 B2 12/2013 Yeo
8,803,857 B2 8/2014 Cok
(Continued)

FOREIGN PATENT DOCUMENTS

KR 10-2008-0053844 6/2008
KR 10-0842488 7/2008
(Continued)

OTHER PUBLICATIONS

International Search Report, PCT/ISA/210, dated Jan. 18, 2023, in PCT Application No. PCT/KR2022/015780.
(Continued)

*Primary Examiner* — Sanghyuk Park
(74) *Attorney, Agent, or Firm* — STAAS & HALSEY LLP

(57) ABSTRACT

A display device includes a backlight, a pixel controlling unit, a power driving unit, a source driving unit which transmits, to the pixel controlling unit, intensities of the LEDs connected to the pixel controlling unit, and a timing controlling unit. The pixel controlling unit adjusts, in a first time section, an intensity of a first LED based on a first intensity received from the source driving unit, wherein the first LED is connected to a first line which is activated by the power driving. The pixel controlling unit adjusts, in a second time section different from the first time section, an intensity of a second LED based on a second intensity received from the source driving unit, wherein the second LED is connected to a second line which is activated by the power driving unit.

20 Claims, 8 Drawing Sheets

Related U.S. Application Data continuation of application No. PCT/KR2022/015780, filed on Oct. 17, 2022.

(52) U.S. Cl.
CPC . *G09G 2310/0267* (2013.01); *G09G 2310/08* (2013.01); *G09G 2320/064* (2013.01); *G09G 2330/02* (2013.01); *G09G 2340/0435* (2013.01)

(58) Field of Classification Search
CPC ......... G09G 2320/064; G09G 2330/02; G09G 2340/0435; G02F 1/1336
See application file for complete search history.

(56) References Cited

U.S. PATENT DOCUMENTS

| | | | | |
|---|---|---|---|---|
| 9,153,171 | B2 | 10/2015 | Sakariya et al. | |
| 10,332,467 | B2 | 6/2019 | Lee et al. | |
| 10,417,980 | B2 | 9/2019 | Lee et al. | |
| 10,643,553 | B2 | 5/2020 | Gu et al. | |
| 10,935,841 | B2 | 3/2021 | Shao et al. | |
| 10,952,300 | B2 | 3/2021 | Cheng et al. | |
| 2005/0184952 | A1* | 8/2005 | Konno | G09G 3/3648 345/102 |
| 2008/0204397 | A1 | 8/2008 | Jang et al. | |
| 2010/0045893 | A1 | 2/2010 | Chiang | |
| 2013/0120326 | A1 | 5/2013 | Chung | |
| 2013/0162150 | A1* | 6/2013 | Masuda | H05B 45/375 315/186 |
| 2013/0278166 | A1* | 10/2013 | Katoh | H03K 17/063 327/108 |
| 2015/0116379 | A1 | 4/2015 | Lim | |
| 2019/0340972 | A1 | 11/2019 | Hao | |
| 2020/0380923 | A1 | 12/2020 | Sun et al. | |
| 2021/0304666 | A1* | 9/2021 | Wu | G09G 3/3216 |
| 2021/0350754 | A1 | 11/2021 | Lee et al. | |
| 2022/0191987 | A1 | 6/2022 | Lopez Julia | |
| 2022/0270562 | A1 | 8/2022 | Jung et al. | |

FOREIGN PATENT DOCUMENTS

| | | |
|---|---|---|
| KR | 10-2008-0078095 | 8/2008 |
| KR | 10-2011-0090577 | 8/2011 |
| KR | 10-1056046 | 8/2011 |
| KR | 10-1373861 | 3/2014 |
| KR | 10-2014-0051152 | 4/2014 |
| KR | 10-1797047 | 11/2017 |
| KR | 10-2018-0036889 | 4/2018 |
| KR | 10-2153849 | 9/2020 |
| KR | 10-2021-0057417 | 5/2021 |
| KR | 10-2279464 | 7/2021 |
| KR | 10-2306098 | 9/2021 |
| KR | 10-2022-0000760 | 1/2022 |
| KR | 10-2551915 | 7/2023 |

OTHER PUBLICATIONS

Written Opinion, PCT/ISA/237, dated Jan. 18, 2023, in PCT Application No. PCT/KR2022/015780.
Office Action dated Jul. 10, 2023 issued in U.S. Appl. No. 17/980,939.
Interview Summary dated Sep. 19, 2023 issued in U.S. Appl. No. 17/980,939.
Office Action dated Jan. 19, 2024 issued in U.S. Appl. No. 17/980,939.
Advisory Action Office Action dated Apr. 23, 2024 issued in U.S. Appl. No. 17/980,939.
Notice of Allowance dated May 24, 2024 issued in U.S. Appl. No. 17/980,939.
U.S. Appl. No. 17/980,939, filed Nov. 4, 2022, Minhoon Lee, Samsung Electronics Co., Ltd.
Search Report dated Nov. 15, 2024, issued in European Application No. EP 22 92 0762.
Office Action dated Apr. 19, 2025, in Korean Application No. 10-2022-006130.

* cited by examiner

DISPLAY DEVICE AND METHOD FOR CONTROLLING LEDS OF BACKLIGHT PANEL

CROSS-REFERENCE TO RELATED APPLICATION(S)

This application is a continuation of U.S. Ser. No. 17/980,939, filed on Nov. 4, 2022, which is a continuation of PCT International Application No. PCT/KR2022/015780, filed on Oct. 17, 2022, and claims priority to Korean Patent Application No. 10-2022-0006130, filed on Jan. 14, 2022, in the Korean Intellectual Property Office, the disclosure of which are incorporated by reference herein their entirety.

BACKGROUND

Field

The following disclosure relates to a display device and method for controlling light emitting diodes (LEDs) of a backlight panel.

Description of the Related Art

According to the recent development of electronic technology, various types of display devices are being developed and distributed, and the demand for large display devices is increasing. A display device may display color using a liquid crystal that adjusts transmittance of light. Backlight refers to hardware that generates light to be output toward a display panel for displaying colors such as a liquid crystal.

In order to improve the color reproduction characteristics of a display device, a method for adjusting the intensity of light output from the backlight may be required.

A method for miniaturizing, or simplifying a circuit for adjusting the intensity of light output from a backlight may be required.

The technical problems to be achieved in this document are not limited to those described above, and other technical problems not mentioned herein will be clearly understood by those having ordinary knowledge in the art to which the present disclosure belongs, from the following description.

SUMMARY

According to an embodiment of the disclosure, a display device may comprise a backlight unit including a plurality of LEDs (Light Emitting Diodes). The display device may comprise a pixel controlling unit connected to, among the plurality of LEDs, LEDs arranged in a first direction. The display device may comprise a power driving unit sequentially which activates the LEDs connected to the pixel controlling unit by using a plurality of lines arranged in a second direction different from the first direction. The display device may comprise a source driving unit which transmits, to the pixel controlling unit, intensities of the LEDs connected to the pixel controlling unit. The display device may comprise a timing controlling unit for controlling the power driving unit and the source driving unit based on synchronized time sections. The pixel controlling unit may be configured to adjust, in a first time section among the time sections, an intensity of a first LED based on a first intensity received from the source driving unit, wherein the first LED, among the LEDs connected to the pixel controlling unit, is connected to a first line which is activated by the power driving unit among the plurality of lines. The pixel controlling unit may be configured to adjust, in a second time section different from the first time section among the time sections, an intensity of a second LED based on a second intensity received from the source driving unit, wherein the second LED, among the LEDs connected to the pixel controlling unit, is connected to a second line which is activated by the power driving unit among the plurality of lines.

According to an embodiment, a method of a display device may comprise transmitting a power signal, by controlling a power driving unit connected to power lines connected to a plurality of LEDs included in the display device, to a first power line among the power lines. The method of the display device may comprise transmitting a control signal, while transmitting the power signal to the first power line, to a plurality of pixel controlling units respectively connected to first LEDs among the plurality of LEDs which are connected to the first power line, wherein the control signal indicates intensities of each of the first LEDs. The method of the display device may comprise transmitting the power signal, in response to identification of an expiration of a preset duration after transmitting the power signal to the first power line, to a second power line different from the first power line by controlling the power driving unit, wherein the second power line is connected to second LEDs among the plurality of LEDs different from the first LEDs. The intensities of the first LEDs may be maintained as intensities indicated by the controlling signal in the preset period as the control signal is transmitted to the plurality of pixel controlling units.

According to an embodiment, a display device may comprise a plurality of LEDs disposed on a surface of the display device. The display device may comprise a plurality of pixel controlling units for respectively controlling groups of the plurality of LEDs. Each of the groups may include LEDs among the plurality of LEDs displaced along a first direction, and be separated along a second direction perpendicular to the first direction. The display device may comprise a source driving unit that transmits a first signal indicating an intensity of one of the plurality of LEDs, to at least one of the plurality of pixel controlling units, based on a plurality of source lines respectively connected to the plurality of pixel controlling units and formed on the surface along the first direction. The display device may comprise a gate driving unit that transmits a second signal for maintaining an intensity indicated by the first signal during a preset duration based on a gate line, wherein the gate line is formed on the surface along the second direction and respectively connected to the plurality of pixel controlling circuits. The display device may comprise a power driving unit which sequentially activates, based on the preset duration, LEDs included in the groups based on a plurality of power lines, wherein the plurality of power lines are formed on the surface along the second direction and are separated from each other along the first direction.

Due to pixel circuits having less than the number of LEDs included in the backlight panel, the display device according to embodiments disclosed herein can improve color reproduction characteristics of the display device by controlling the LEDs.

Since the display device, as described herein, is capable of separating moments, or times, at which a power signal is transmitted from each of the plurality of LEDs in a time domain, a single pixel circuit may activate the plurality of LEDs at each of the moments.

The effects that can be obtained from the present disclosure are not limited to those described above, and other effects not mentioned herein will be clearly understood by those having ordinary skill in the art to which the present disclosure belongs, from the following description.

DETAILED DESCRIPTION

Figure 1A:
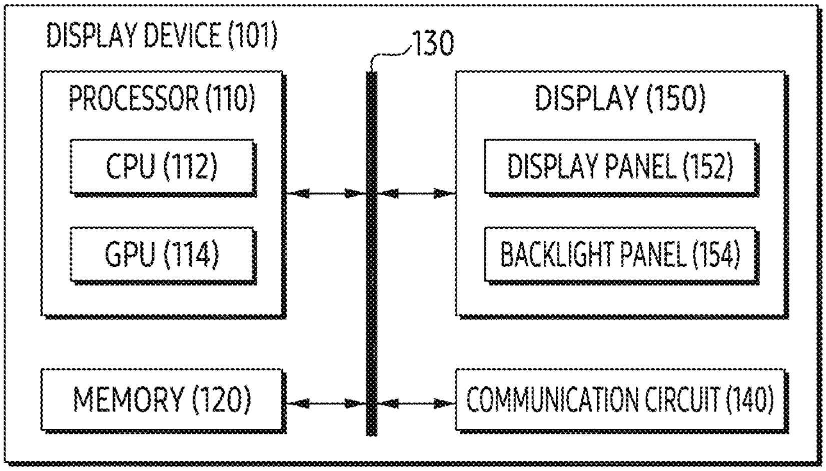
FIGS. 1A and 1B are block diagrams of a display device according to an embodiment.

Various embodiments of the present disclosure will be described with reference to the accompanying drawings.

It should be appreciated that various embodiments of the present disclosure and the terms used herein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "Ist" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 1B:
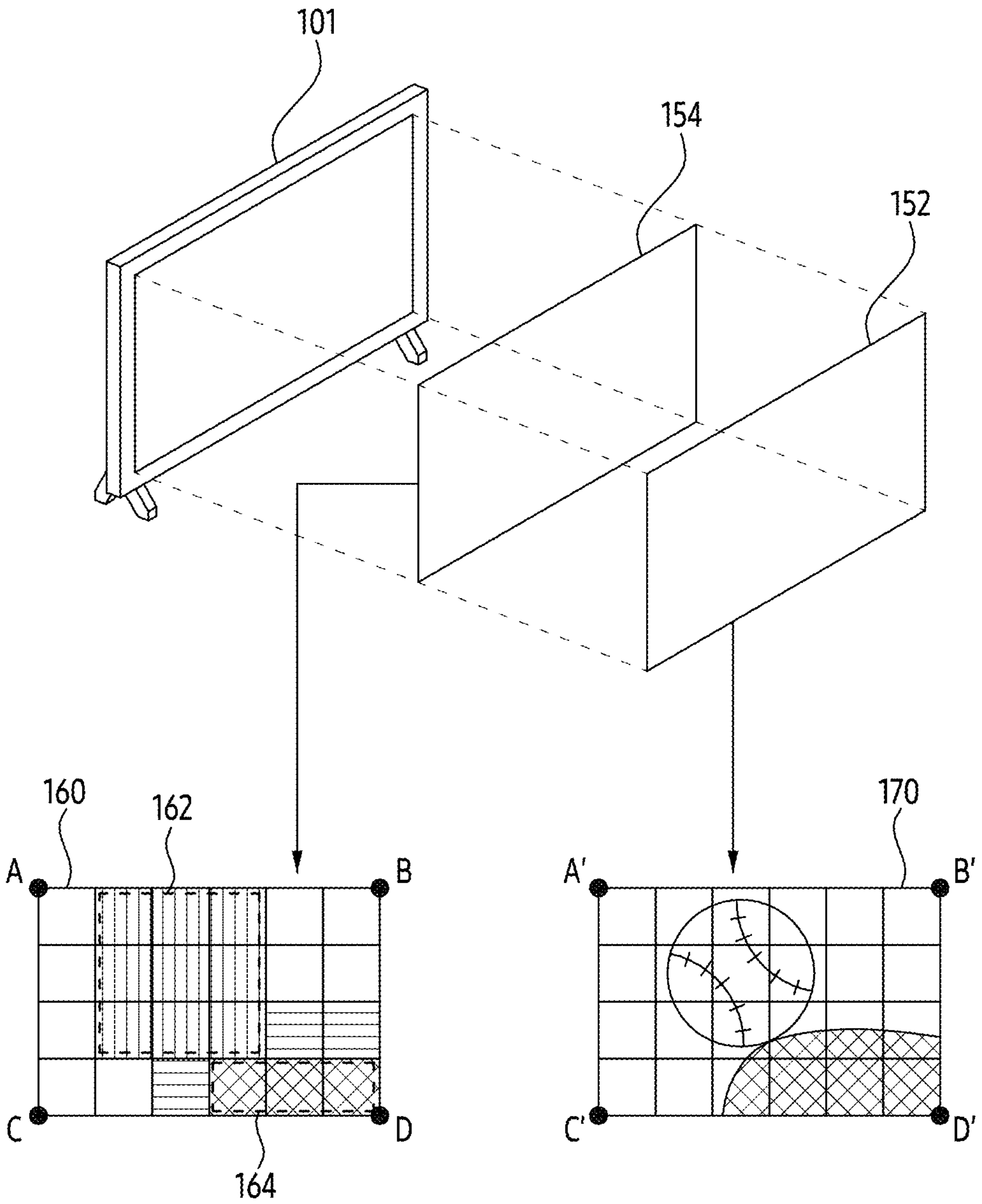

FIGS. 1A and 1B are block diagrams of a display device 101 according to an embodiment of the disclosure. In an embodiment, the display device 101 may be an electronic device capable of displaying a video. For example, the display device 101 may include a television (TV), a monitor, a computer, a smartphone, a tablet, a portable media player, a wearable device, a video wall, an electronic frame, and the like. Hereinafter, it is assumed that the display device 101 is implemented as a TV for convenience of description, but the embodiment is not limited thereto.

Referring to FIG. 1A, the display device 101 according to an embodiment may include at least one of a processor 110, a memory 120, a communication circuit 140, and a display 150. The processor 110, the memory 120, the communication circuit 140, and the display 150 may be electrically connected through a communication bus 130.

The processor 110 of the display device 101 according to an embodiment may include an integrated circuit (IC) (e.g., Central Processing Unit (CPU) 112, and/or Graphic Processing Unit (GPU) 114) for processing data based on one or more instructions. For example, the CPU 112 may include an arithmetic and logic unit (ALU), a floating point unit (FPU), and a field programmable gate array (FPGA). The number of CPUs 112 may be one or more. For example, the CPU 112 may have a multi-core processor structure such as a dual-core, a quad-core, or a hexa-core. For example, the GPU 114 may obtain a video to be output through the display 150 based on at least one application and/or system software executed by the CPU 112. In an embodiment, the GPU 114 may control a display driver-IC (DDI) and/or a graphic memory included in the display 150 to generate a screen to be output through the display 150.

The memory 120 of the display device 101 according to an embodiment may include a hardware component for storing data and/or instruction input and/or output to the processor 110. The memory 120 may include, for example, a volatile memory such as a random-access memory (RAM) and/or a non-volatile memory such as a read-only memory (ROM). For example, the volatile memory may include at least one of Dynamic RAM (DRAM), Static RAM (SRAM), Cache RAM, and PSRAM (Pseudo SRAM). For example, the non-volatile memory may include at least one of a Programmable ROM (PROM), an Erasable PROM (EPROM), an Electrically Erasable PROM (EEPROM), a flash memory, a hard disk, a compact disk, and an Embedded Multi-Media Card (eMMC). In the memory 120, one or more instructions indicating an operation to be performed by the processor 110 on data may be stored. A set of instructions may be referred to as firmware, an operating system, a process, a routine, a sub-routine, and/or an application. In the memory 120, information indicating a video to be displayed through the display 150 of the display device 101 may be stored.

The communication circuit 140 of the display device 101 according to an embodiment may include a hardware component for supporting transmission and/or reception of an electrical signal between the display device 101 and an external electronic device. The communication circuit 140 may include, for example, at least one of a MODEM, an antenna, and/or an optical/electronic (O/E) converter. The communication circuit 140 may support transmission and/or reception of an electrical signal based on various types of protocols such as Ethernet, Local Area Network (LAN), Wide Area Network (WAN), Wireless Fidelity (Wi-Fi), Bluetooth, Bluetooth Low Energy (BLE), ZigBee, Long Term Evolution (LTE), and 5G NR (New Radio).

The display 150 of the display device 101 according to an embodiment may output visualized information to a user. For example, the display 150 may be controlled by an integrated circuit such as GPU 114 to output visualized information to a user. The display 150 may include a Flat Panel Display (FPD) and/or an electronic paper. The FPD may include a Liquid Crystal Display (LCD), a Plasma Display Panel (PDP), and/or one or more Light Emitting Diode (LED). The LED may include an Organic LED (OLED).

Although not shown, the display device 101 may further include a speaker (not shown) for outputting a voice corresponding to a video displayed through the display 150. The number of speakers included in the display device 101 may be related to the type of audio channel supported by the display device 101 (e.g., mono, stereo, or stereoscopic sound exceeding 2 channels). In an embodiment, the display device 101 may communicate with a speaker independent of the display device 101 through the communication circuit 140 to output a voice corresponding to a video displayed through the display 150.

Referring to FIG. 1A, the display device 101 according to an embodiment may include a display panel 152 and a backlight panel 154. The display panel 152 and the backlight panel 154 may be formed to be superimposed on one surface of the display device 101. According to an embodiment, the display panel 152 of the display device 101 may include a liquid crystal included in a planar layer. The backlight panel 154 of the display device 101 may include a plurality of Light Emitting Diodes (LEDs) disposed toward the display panel 152 and emitting light toward the liquid crystal included in the display panel 152. The display device 101 may adjust the transmittance of light reaching the liquid crystal from the backlight panel 154 based on the voltage and/or current. As the display device 101 adjusts the transmittance of the light of the liquid crystal, a video may be played on the display panel 152.

According to an embodiment, the display device 101 may improve color reproduction characteristics of a video output from the display 150 by changing intensity of light output from the backlight panel 154 and/or color. For example, the display device 101 may adjust luminance and/or intensity of LEDs included in the backlight panel 154 to increase a contrast ratio of video data output from the display 150. In an embodiment, the display device 101 may individually control intensity of LEDs of the backlight panel 154 to improve color reproduction characteristics.

Referring to FIG. 1B, according to an embodiment, an example of distribution of intensity of the backlight panel 154 according to a video displayed on the display panel 152 of the display device 101 is illustrated. According to an embodiment, the backlight panel 154 may be disposed on one surface of the display device 101. The display panel 152 may be disposed on the one surface of the display device 101 to be superimposed on the backlight panel 154. As the display panel 152 is disposed to be superimposed on the backlight panel 154, the backlight panel 154 may be covered with the display panel 152. In the backlight panel 154, a plurality of LEDs may be disposed to emit light toward the display panel 152.

According to an embodiment, the display device 101 may display different videos along time sections divided in a time domain by a frame rate. The frame rate is the number of videos that the display device 101 may continuously display per second, and may be adjusted among, for example, 12 frames-per-second (fps), 24 fps, 60 fps, 120 fps, and/or 240 fps. Hereinafter, frame may mean a single time section distinguished by the frame rate.

Referring to FIG. 1B, in a frame, a two-dimensional distribution 160 of intensity of LEDs included in the backlight panel 154 and the video 170 displayed on the display panel 152 of the display device 101 is illustrated. Each of the corners (e.g., A', B', C', D') of the video 170 and the corners (e.g., A, B, C, and D) of the distribution 160 may be superimposed on each other on one surface of the display device 101. The grids of the video 170 and the grids of two-dimensional distribution 160 are illustrated for convenience of description.

In the example of FIG. 1B, the video 170 may include a partially dark area (e.g., a portion adjacent to corner D' and corresponding to the shadow of the subject, which is a baseball) and a relatively bright area (e.g., a portion adjacent to corner A'). The display device 101 may adjust the distribution 160 of the intensity of the LEDs of the backlight panel 154 based on the brightness distribution of the video 170.

Referring to FIG. 1B, according to an embodiment, the distribution 160 that is obtained by the display device 101 based on the video 170 and indicates the intensity of one or more LEDs included in each of 6×4 cells is shown. The intensity of each of the cells may be determined by the color and/or brightness of a portion corresponding to the cell in video 170. The number of cells included in the distribution 160 may be related to the number of LEDs included in the backlight panel 154, and is not limited to the embodiment of FIG. 1B. For example, within distribution 160, a brightness of a portion 164 corresponding to the relatively dark area in the video 170 may be darker than that of a portion 162 corresponding to the relatively bright area in the video 170. According to an embodiment, the display device 101 may change the intensity of each of a plurality of LEDs of the backlight panel 154 based on the distribution 160 obtained from the video 170. For example, the display device 101 may adjust the intensity of a plurality of LEDs in the frame with a partial intensity corresponding to the positions of each of the plurality of LEDs in the distribution 160.

In order to adjust the intensities of a plurality of LEDs based on the distribution 160, the backlight panel 154 may include a circuit for adjusting the intensity of a plurality of LEDs. According to an embodiment, the backlight panel 154 of the display device 101 may cause the plurality of LEDs to maintain the intensity assigned by the distribution 160 for a relatively long time based on an active matrix method. According to an embodiment, the backlight panel 154 may individually control the plurality of LEDs based on a simplified circuit. According to an embodiment, the backlight panel 154 may support control of the plurality of LEDs based on a relatively simplified circuit by separating a time section for supplying power to the plurality of LEDs.

Hereinafter, referring to FIG. 2, a structure of a backlight panel 154 according to an embodiment is described.

Figure 2:
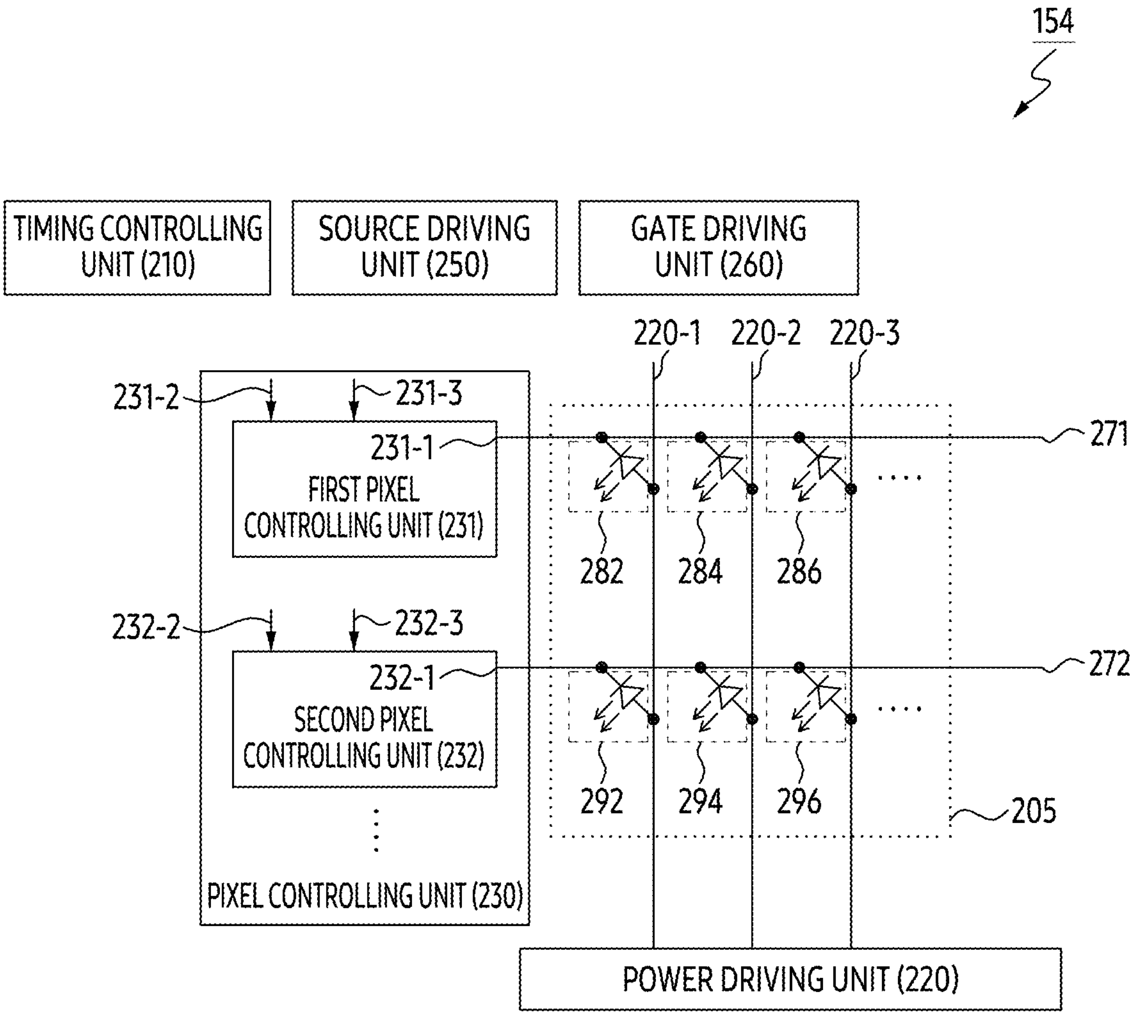
FIG. 2 is an exemplary block diagram showing a backlight panel of a display device according to an embodiment.

FIG. 2 is an exemplary block diagram showing the backlight panel 154 of a display device according to an embodiment. The display device of FIG. 2 may be an example of the display device 101 of FIGS. 1A and 1B. For example, the backlight panel 154 of FIG. 2 may be an example of the backlight panel 154 of FIGS. 1A and 1B.

According to an embodiment, the backlight panel 154 may include a backlight unit 205 including a plurality of LEDs arranged along a first direction on a two-dimensional plane and a second direction perpendicular to the first direction. In the backlight unit 205, each of the plurality of LEDs may emit light based on a potential difference between an anode and a cathode. For example, each of the plurality of LEDs may emit light based on a current flowing from the anode toward the cathode or a potential difference. Referring to FIG. 2, LEDs 282, 284, 286, 292, 294, and 296 included in a portion of a plurality of LEDs of the backlight panel 154 are illustrated. While six LEDs are shown, any suitable number of LEDs could be used. As a plurality of LEDS of the backlight unit 205 are separated from each other on the backlight panel 154, the plurality of LEDs may output light directed to distinct portions of the display panel (e.g., the display panel 152 of FIGS. 1A and 1B) superimposed on the backlight panel 154.

According to an embodiment, the backlight panel 154 may include a pixel controlling unit 230 including a first node connected to cathodes of a plurality of LEDs. The pixel controlling unit 230 may include a circuit element for maintaining at least one intensity of the plurality of LEDs for a preset duration. For example, the pixel controlling unit 230 may adjust at least one intensity of the plurality of LEDs based on an intensity indicated by a signal received through a second node distinguished from the first node. The pixel controlling unit 230 may identify a moment, or time, at which the intensity is received through the second node based on a signal received from a third node distinguished from the first node and the second node. The pixel controlling unit 230 may be implemented on the backlight panel 154 based on an application-specific integrated circuit (ASIC) and/or a thin film transistor (TFT). In an embodiment, the pixel controlling unit 230 may be referred to as a pixel circuit, a pixel integrated circuit (pixel-IC), and/or a pixel control circuit.

Referring to FIG. 2, the backlight panel 154 may include a plurality of pixel controlling units, such as a first pixel controlling unit 231 and/or a second pixel controlling unit 232. While two pixel controlling units are shown, any suitable number may be used. A first node 231-1 of the first pixel controlling unit 231 may be commonly connected to cathodes of the LEDs 282, 284, and 286 arranged along the first direction. In order to connect the first node 231-1 of the first pixel controlling unit 231 and the LEDs 282, 284, and 286, the backlight panel 154 may include a line 271 extending from the first node 231-1 along the first direction. The first node 232-1 of the second pixel controlling unit 232 may be commonly connected to cathodes of the LEDs 292, 294, and 296 arranged along the first direction. The LEDs 282, 284 and 286 are separated from the LEDs 292, 294, and 296, wherein the LEDs 282, 284 and 286 are connected to the first pixel controlling unit 231. In order to connect the first node 232-1 of the second pixel controlling unit 232 and the LEDs 292, 294, and 296, the backlight panel 154 may include a line 272 extending from the first node 232-1 along the first direction. In an embodiment, while the first pixel controlling unit 231 controls the intensities of the LEDs 282, 284, and 286, the second pixel controlling unit 232 may control the intensities of the LEDs 292, 294, and 296. While two lines 271, 272 are shown, any suitable number of lines may be used.

Referring to FIG. 2, in order to control the pixel controlling unit 230 and/or the plurality of LEDs, the backlight panel 154 may include a timing controlling unit 210, a power driving unit 220, a source driving unit 250, and a gate driving unit 260. According to an embodiment, the power driving unit 220 may adjust a moment, or time, when each of a plurality of LEDs receives a power signal using power lines connected to anodes of the plurality of LEDs. In an embodiment, the timing controlling unit 210 may be referred to as a timing controller and/or a controller. In an embodiment, the source driving unit 250 may be referred to as a source driving circuit. In an embodiment, the power driving unit 220 may be referred to as a power driving circuit. In an embodiment, the gate driving unit 260 may be referred to as a gate driving circuit.

According to an embodiment, the source driving unit 250 may transmit a signal indicating the intensity of at least one LED to the second node (e.g., second nodes 231-2 and 232-2) of the pixel controlling unit 230 through one or more source lines. According to an embodiment, the gate driving unit 260 may transmit a signal indicating a moment, or time, at which the pixel controlling unit 230 receives the intensity of the LED to the third node (e.g., third nodes 231-3 and 232-3) of the pixel controlling unit 230 through one or more gate lines. The structure of the one or more source lines and/or the one or more gate lines will be described with reference to FIGS. 3 and 4.

According to an embodiment, the power driving unit 220 may sequentially input a power signal to power lines (e.g., the first power line 220-1, the second power line 220-2, and the third power line 220-3) arranged along the second direction on one surface where the LEDs of the backlight panel 154 are disposed. For example, at a moment when the power signal inputs the power signal to the first power line 220-1, the power driving unit 220 may at least temporarily stop inputting the power signal to other power lines (e.g., the second power line 220-2 and the third power line 220-3). The power lines may be connected to anodes of different LEDs. In an embodiment of FIG. 2, the first power line 220-1 may be connected to anodes of the LEDs 282 and 292, the second power line 220-2 may be connected to anodes of the LEDs 284 and 294, and the third power line 220-3 may be connected to anodes of the LEDs 286 and 296. At the moment exemplified above, the LEDs 282 and 292 connected to the first power line 220-1 may receive the power signal. In this case, the first pixel controlling unit 231-1 and the second pixel controlling unit 232-1 may adjust and/or maintain the intensity of each of the LEDs 282 and 292 to the intensity received from the source driving unit 250.

According to an embodiment, sequentially inputting the power signal to the power lines by the power driving unit 220 may be performed based on a preset period less than a frame. For example, within a first time section in which the power signal is applied to the first power line 220-1 based on the preset period, the first pixel controlling unit 231-1 may adjust the intensity of the LED 282 based on the first intensity received from the source driving unit 250 through the second node 231-2. Similarly, within the first time section, the second pixel controlling unit 232 may control the intensity of the LED 292 independently of the first intensity. Within a second time section different from the first time section and in which the power signal is applied to the second power line 220-2, the first pixel controlling unit 231-1 may adjust the intensity of the LED 284 based on the second intensity received through the second node 231-2. Similarly, within the second time section, the second pixel controlling unit 232 may maintain the intensity of the LED 294 independently of the second intensity.

According to an embodiment, the source driving unit 250 may output a signal indicating the intensity of a plurality of LEDs. The signal output from the source driving unit 250 may be generated based on at least one of pulse-with modulation (PWM) indicating the intensity of the LEDs based on the duty ratio and/or pulse amplitude modulation (PAM) indicating the intensity of the LEDs based on the amplitude. The source driving unit 250 may generate an analog signal based on the PWM and/or the PAM from a digital signal indicating the intensity of the plurality of LEDs from the timing control unit 210. In an embodiment, the timing controlling unit 210 may transmit a digital signal indicating the distribution of intensity (e.g., distribution 160 of FIG. 1B) of a plurality of LEDs to the source driving unit 250 based on a moment of the frame.

According to an embodiment, the gate driving unit 260 may output a signal for notifying at least one of a moment when the pixel controlling unit 230 receives a signal output from the source driving unit 250 and/or a time section during which the pixel controlling unit 230 maintains the intensity of the LED based on the signal received from the source driving unit 250. According to an embodiment, the timing controlling unit 210 may synchronize the power driving unit 220, the source driving unit 250, and the gate driving unit 260 based at least on the preset period. For example, the timing controlling unit 210 may control at least one of a power driving unit 220, a source driving unit 250, and a gate driving unit 260 based on synchronized time sections. In an embodiment, the timing controlling unit 210 may obtain a distribution (e.g., a distribution 160 of FIG. 1B) of intensities of the plurality of LEDs from a video (e.g., a video 170 of FIG. 1B) assigned to the display panel. The timing controlling unit 210 may receive a synchronization signal (e.g., Hsync, and/or Vsync) from the display panel 152 to be synchronized with a moment when the video is output from the display panel 152. In order to prevent flicker caused by the backlight panel 154, the timing controlling unit 210 may operate based on a frequency exceeding a frame rate at which a video is displayed on the display panel 152.

As described above, according to an embodiment, the backlight panel 154 may operate in an active matrix method in which a plurality of LEDs (e.g., LEDs connected to a specific power line) are simultaneously activated. According to an embodiment, the backlight panel 154 may be simplified compared to a case in which pixel controlling units are formed and arranged 1:1 on a plurality of LEDs by including a pixel controlling unit 230 commonly connected to the plurality of LEDs. According to an embodiment, the backlight panel 154 may make each of the plurality of LEDs maintain the intensity of one LED at a specific moment by performing time-sharing control on the power lines.

Hereinafter, referring to FIGS. 3 to 4, different structures in which the source driving unit 250 and the gate driving unit 260 are connected to the pixel controlling unit 230 are described.

Figure 3:
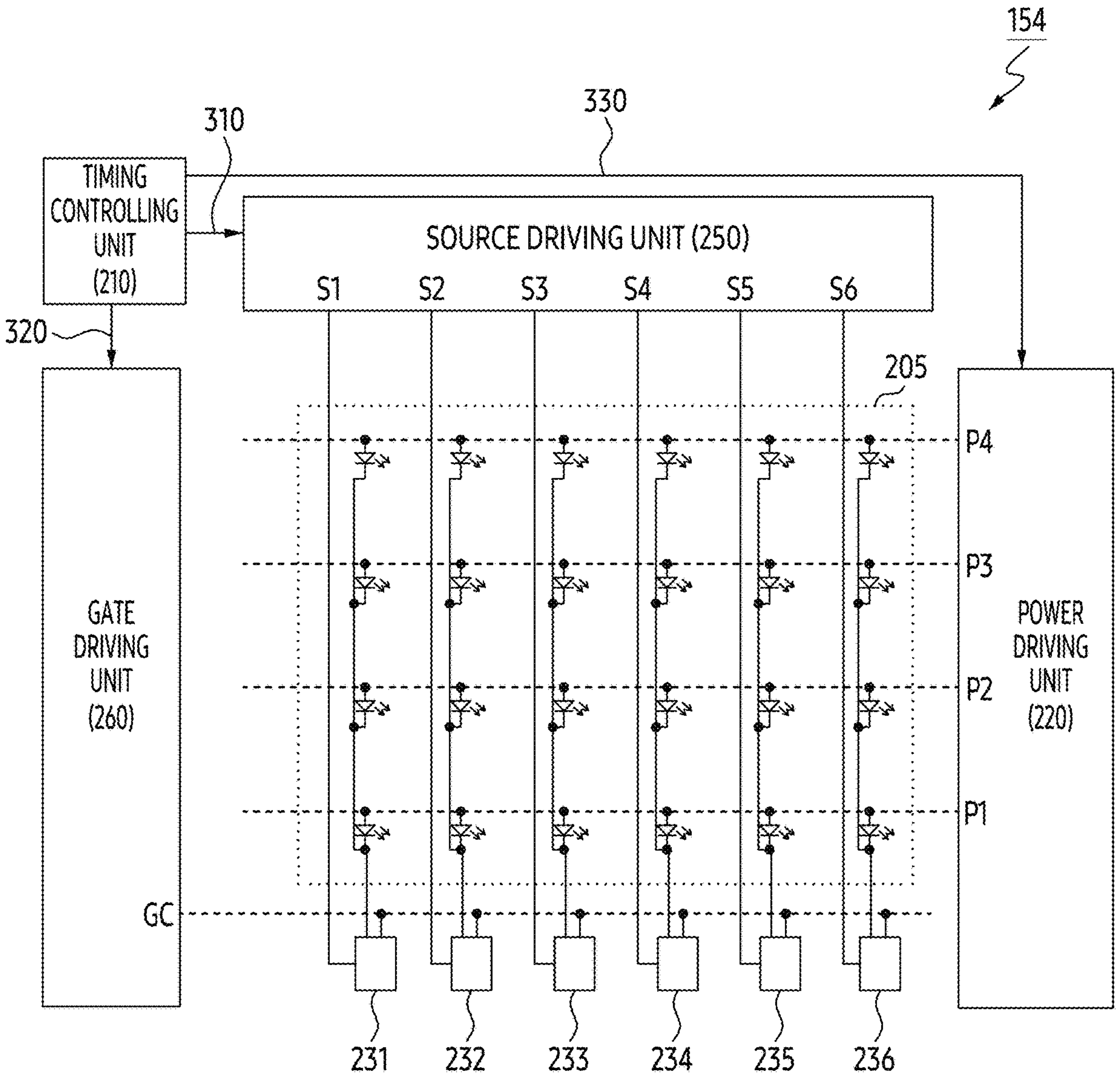
FIG. 3 is an exemplary circuit diagram showing an embodiment in which pixel controlling units included in a backlight panel of a display device share a gate line.

FIG. 3 is an exemplary circuit diagram showing an embodiment in which pixel controlling units included in a backlight panel 154 of a display device share a gate line. The display device of FIG. 3 may be an example of the display device 101 of FIGS. 1A and 1B. For example, the backlight panel 154 of FIG. 3 may be an example of the backlight panel 154 of FIGS. 1A and 1B, and/or FIG. 2.

Referring to FIG. 3, pixel controlling units 231, 232, 233, 234, 235, and 236 of the backlight panel 154 are illustrated according to an embodiment. The pixel controlling units 231, 232, 233, 234, 235, and 236 may be an example of the pixel controlling unit 230 of FIG. 2. Each of the pixel controlling units 231, 232, 233, 234, 235, and 236 may be connected to one or more corresponding LEDs through control lines extending from the first node. In an embodiment shown by FIG. 3 in which the backlight unit 205 includes 24 LEDs, an example in which each of the six pixel controlling units 231, 232, 233, 234, 235, and 236 are connected to four LEDs is illustrated, but the embodiment is not limited thereto. Referring to FIG. 3, the backlight panel 154 may include a plurality of source lines extending from ends S1, S2, S3, S4, S5, and S6 of the source driving unit 250 along a first direction parallel to the control line. The plurality of source lines may be separated in parallel in the second direction within the backlight panel 154. Each of the plurality of source lines may be connected to the second node of the pixel controlling units 231, 232, 233, 234, 235, and 236.

Referring to FIG. 3, within the backlight panel 154, the pixel controlling units 231, 232, 233, 234, 235, and 236 may be arranged along a second direction perpendicular to the first direction. The backlight panel 154 may include a gate line extending from an end GC of the gate driving unit 260 along a second direction perpendicular to the first direction. The gate line may be connected to the third node of the pixel controlling units 231, 232, 233, 234, 235, and 236. In the embodiment of FIG. 3, pixel controlling units 231, 232, 233, 234, 235, and 236 may share a single gate line.

Referring to FIG. 3, the backlight panel 154 may include a plurality of power lines extending from ends P1, P2, P3, and P4 of the power driving unit 220 along a second direction in which the pixel controlling units 231, 232, 233, 234 and 235 are arranged. The plurality of power lines may be separated in parallel in the first direction within the backlight panel 154. Each of the plurality of power lines may be connected to anodes of one or more LEDs adjacent to the power line among the plurality of LEDs.

The timing controlling unit 210 according to an embodiment may synchronize the source driving unit 250, the gate driving unit 260, and the power driving unit 220 by being connected to the source driving unit 250, the gate driving unit 260, and the power driving unit 220. Referring to FIG. 3, the signal 310 transmitted by the timing controlling unit 210 to the source driving unit 250 may include information indicating intensities of a plurality of LEDs included in the backlight panel 154. For example, the information may be based on brightness and/or color of a video output from a display panel (e.g., the display panel 152 of FIGS. 1A and 1B) included in the electronic device (e.g., the electronic device 101 of FIGS. 1A and 1B) within a frame, such as a distribution 160 of FIG. 1B.

In an embodiment, the source driving unit 250 may output an analog electrical signal indicating the intensity of each of the plurality of LEDs using a pulse-width and/or amplitude by performing digital-to-analog conversion from the information included in the signal 310. The source driving unit 250 may output the analog electrical signal to pixel controlling units 231, 232, 233, 234, 235, and 236 using ends S1, S2, S3, S4, S5, and S6. In an embodiment of FIG. 3 in which the source driving unit 250 is connected to a plurality of source lines, the source driving unit 250 may simultaneously output the analog electrical signals to the plurality of source lines. Alternatively, the source driving unit 250 may sequentially output the analog signal to the plurality of source lines connected to the ends S1, S2, S3, S4, S5, and S6.

A moment at which the source driving unit 250 outputs the analog electrical signal may be synchronized with a moment at which the gate driving unit 260 outputs a control signal to the pixel controlling units 231, 232, 233, 234, 235, and 236 by the timing controlling unit 210. In an embodiment of FIG. 3, the timing controlling unit 320 may make the gate driving unit 260 output a control signal to the pixel controlling units 231, 232, 233, 234, 235, and 236 connected to the gate line extended from the end GC by transmitting the signal 320 to the gate driving unit 260. The control signal may indicate a moment when the pixel controlling units 231, 232, 233, 234, 235, and 236 receive an analog electrical signal output from the source driving unit 250 based on a change in voltage and/or current.

For example, at a moment when the voltage of the control signal output from the gate driving unit 260 exceeds a preset threshold, the pixel controlling units 231, 232, 233, 234, 235, and 236 may receive an analog electrical signal through a source line corresponding to the pixel controlling units 231, 232, 233, 234, 235, and 236. Based on the pulse width and/or amplitude of the received analog electrical signal, the intensity of the LED connected to the pixel controlling units 231, 232, 233, 234, 235, and 236 may be identified. Based on the intensity of the identified LED, each of the pixel controlling units 231, 232, 233, 234, 235, and 236 may adjust the intensity of the LED connected to the power line activated by the power driving unit 220.

A moment at which the source driving unit 250 outputs the analog electrical signal may be synchronized with a moment at which the power driving unit 220 sequentially transmits power signals to power lines by timing controlling unit 210. For example, based on the signal 330 transmitted by the timing controlling unit 210 to the power driving unit 220, the power driving unit 220 may transmit a power signal to a first power line extended from the end P1. In response to transmitting the signal 330, the timing controlling unit 210 may cause an analog electrical signal to be transmitted to each of the pixel controlling units 231, 232, 233, 234, 235, and 236 using the source driving unit 250 using the signal 310, wherein the analog electrical signal indicates the intensity of each of the LEDs connected to the first power line. With the signal 310, the timing controlling unit 210 may cause the gate driving unit 260 to transmit a control signal to the pixel controlling units 231, 232, 233, 234, 235, and 236 using the signal 320 transmitted to the gate driving unit 260.

During the first time section in which the power driving unit 220 transmits a power signal to the first power line extended from the end P1, each of the pixel controlling units 231, 232, 233, 234, 235, and 236 may maintain an intensity of the LEDs receiving the power signal through the first power line as an intensity of the LEDs received through the source lines. The timing controlling unit 210 may cause the power driving unit 220 to switch a power line transmitting a power signal based on a preset period using the signal 330. For example, in response to identifying that the first time section expires, the timing controlling unit 210 may cause the power driving unit 220 to stop transmitting the power signal to the first power line and transmit the power signal to the second power line extended from the end P2 using the signal 330. In response to the power driving unit 220 transmitting a power signal to the second power line, the timing controlling unit 210 may cause the pixel controlling units 231, 232, 233, 234, 235, and 236 to receive the intensity of LEDs connected to the second power line by controlling the source driving unit 250 and the gate driving unit 260. Similar to the operation in the first time section, the pixel controlling units 231, 232, 233, 234, 235, and 236 may maintain an intensity of the LEDs receiving the power signal through the second power line as an intensity of the LEDs received through the source lines.

As described above, the backlight panel 154 according to an embodiment may include a plurality of pixel controlling units 231, 232, 233, 234, 235, and 236 sharing a gate line. The timing controlling unit 210 of the backlight panel 154 may sequentially activate a plurality of LEDs partially based on a power line by sequentially activating the power lines of the power driving unit 220 along a preset period. Each of the pixel controlling units 231, 232, 233, 234, 235, and 236 may maintain an intensity of a specific LED, among a plurality of LEDs connected through the first node, connected to a power line as an intensity indicated through the source line. Since each of the pixel controlling units 231, 232, 233, 234, 235, and 236 control a plurality of LEDs at different time sections, the complexity of the backlight panel 154 may be decreased.

Figure 4:
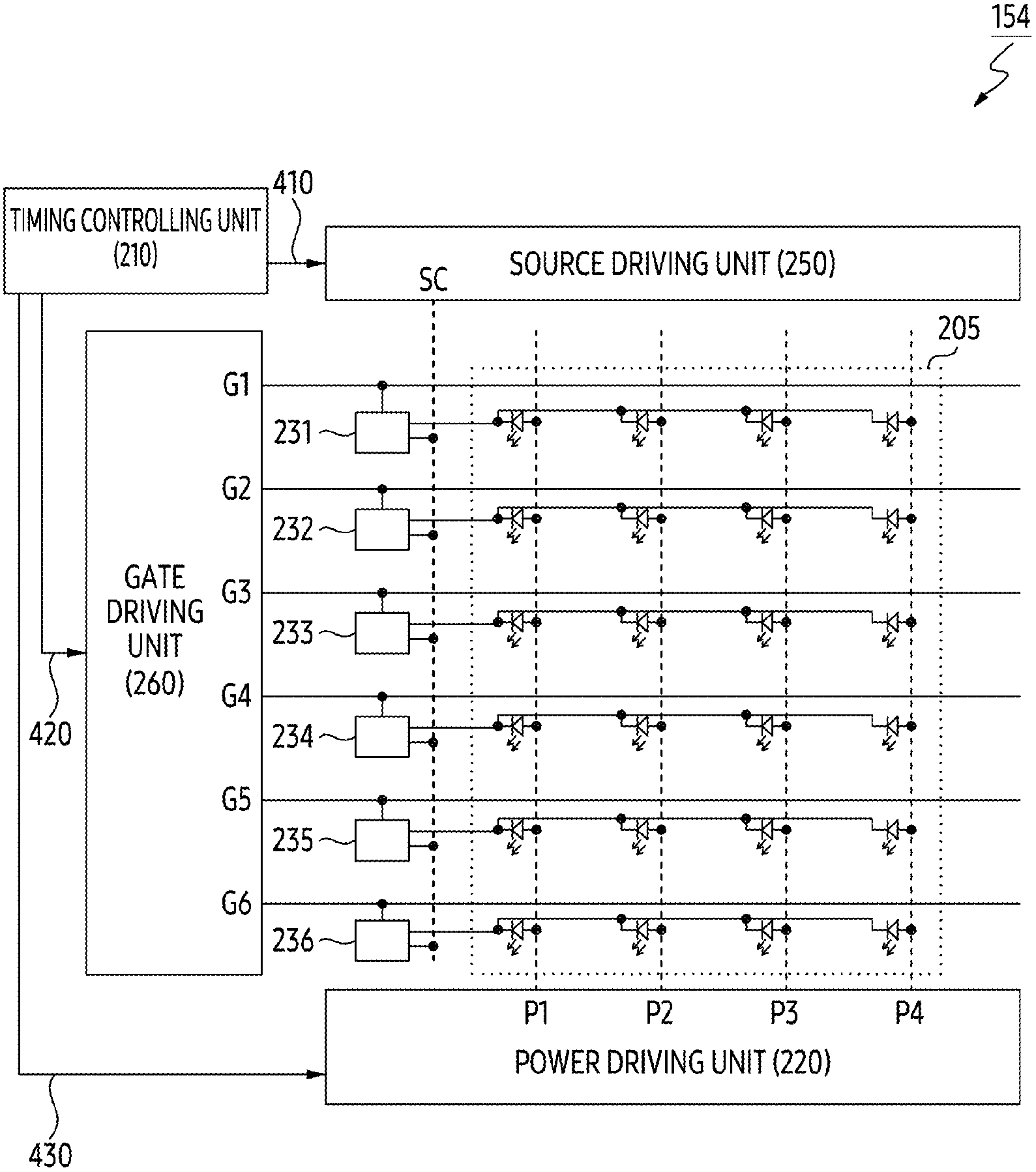
FIG. 4 is an exemplary circuit diagram showing an embodiment in which pixel controlling units included in a backlight panel of a display device share a source line.

FIG. 4 is an exemplary circuit diagram showing an embodiment in which pixel controlling units included in a backlight panel 154 of a display device share a source line. The display device of FIG. 4 may be an example of the display device 101 of FIGS. 1A and 1B. For example, the backlight panel 154 of FIG. 4 may be an example of the backlight panel 154 of FIGS. 1A and 1B, and/or FIG. 2.

Referring to FIG. 4, a plurality of LEDs disposed on a backlight panel 154 in a first direction and a second direction perpendicular to the first direction are illustrated. Each of the pixel controlling units 231, 232, 233, 234, 235, and 236 included in the backlight panel 154 may be connected to LEDs arranged in a line along the first direction among the plurality of LEDs. An example in which each of the six pixel controlling units 231, 232, 233, 234, 235, and 236 is connected to four LEDs is illustrated, but the embodiment is not limited thereto. The first pixel controlling unit 231 may be connected to cathodes of LEDs arranged in a line along a first direction through a first node. As the pixel controlling units 231, 232, 233, 234, 235, and 236 are separated from each other in the second direction, LEDs connected to each of the pixel controlling units 231, 232, 233, 234, 235, and 236 may also be separated in parallel in the second direction.

Referring to FIG. 4, the backlight panel 154 may include a source line extending, from the end of the source driving unit 250, along the second direction in which pixel controlling units 231, 232, 233, 234, 235, and 236 are disposed. The source line may be connected to a second node of each of the pixel controlling units 231, 232, 233, 234, 235, and 236. In an embodiment of FIG. 4, the pixel controlling units 231, 232, 233, 234, 235, and 236 may share a single source line. The backlight panel 154 may include a plurality of gate lines extending along the first direction from the ends G1, G2, G3, G4, G5, and G6 of the gate driving unit 260. The plurality of gate lines may be connected to each of the third nodes of the pixel controlling units 231, 232, 233, 234, 235, and 236, respectively.

Referring to FIG. 4, the backlight panel 154 may include a plurality of power lines extending, from the ends P1, P2, P3, and P4 of the power driving unit 220, along the second direction perpendicular to the first direction. Each of the plurality of power lines may be connected to anodes of one or more LEDs. The plurality of power lines may be separated in parallel in the first direction.

Similar to the description of FIG. 3, according to an embodiment, the timing controlling unit 210 may synchronize operations of each of the source driving unit 250, the gate driving unit 260, and the power driving unit 220. For example, the timing controlling unit 210 may synchronize moments, or time periods, when the power driving unit 220 sequentially activates power lines, a moment when the gate driving unit 260 transmits a control signal to the pixel controlling units 231, 232, 233, 234, 235, and 236, and a moment when the gate driving unit 260 transmits an electrical signal indicating the intensity of LEDs connected to the power line in which the source driving unit 250 is activated, using the signals 410, 420, and 430.

For example, moments at which the power driving unit 220 sequentially activates power lines connected to each of the ends P1, P2, P3, and P4 may be adjusted by a signal 430 transmitted from the timing controlling unit 210 to the power driving unit 220. For example, within a first time section, or time period, in which the power driving unit 220 activates the first power line extending from the end P1, the timing controlling unit 210 may transmit the intensity of LEDs connected to the first power line to each of the pixel controlling units 231, 232, 233, 234, 235, and 236, using signals 410 (to source driving unit 250) and 420 (to gate driving unit 260).

For example, within the first time section, the timing controlling unit 210 may cause the source driving unit 250 to output a pulse signal indicating intensities of LEDs connected to the first power line extended from the end P1 to a source line using the signal 410. Within the first time section, the timing controlling unit 210 may cause the gate driving unit 260 to output a control signal indicating which pulse to receive, among pulses included in the pulse signal, from each of the gate lines and pixel controlling units 231, 232, 233, 234, 235, and 236, using the signal 420. The pixel controlling units 231, 232, 233, 234, 235, and 236 may maintain the intensity of the LEDs connected to the first power line during the first time section as the intensity indicated by the pulse-width and/or amplitude of the pulse signal received through the source line. The duration of the first time section may correspond to a preset period for switching power lines. For example, within the first time section, in response to identifying the expiration of a preset period, the timing controlling unit 210 may cause the power driving unit 220 to transmit a power signal to a second power line (e.g., a second power line extended from an end P2) different from the first power line by using the signal 430.

As described above, according to an embodiment, the pixel controlling units 231, 232, 233, 234, 235, and 236 of the backlight panel 154 may receive intensities of LEDs connected to a specific power line activated by the power driving unit 220 through a shared source line. While a specific power line is activated, the pixel controlling units 231, 232, 233, 234, 235, and 236 may maintain intensities of LEDs connected to the specific power line as intensities of the received LEDs. As a plurality of LEDs are controlled based on power lines that are sequentially activated, the number of pixel controlling units may be reduced to less than the number of LEDs included in the backlight panel 154.

Hereinafter, referring to FIG. 5, moments at which a signal is transmitted within the backlight panel 154 according to an embodiment are described.

Figure 5:
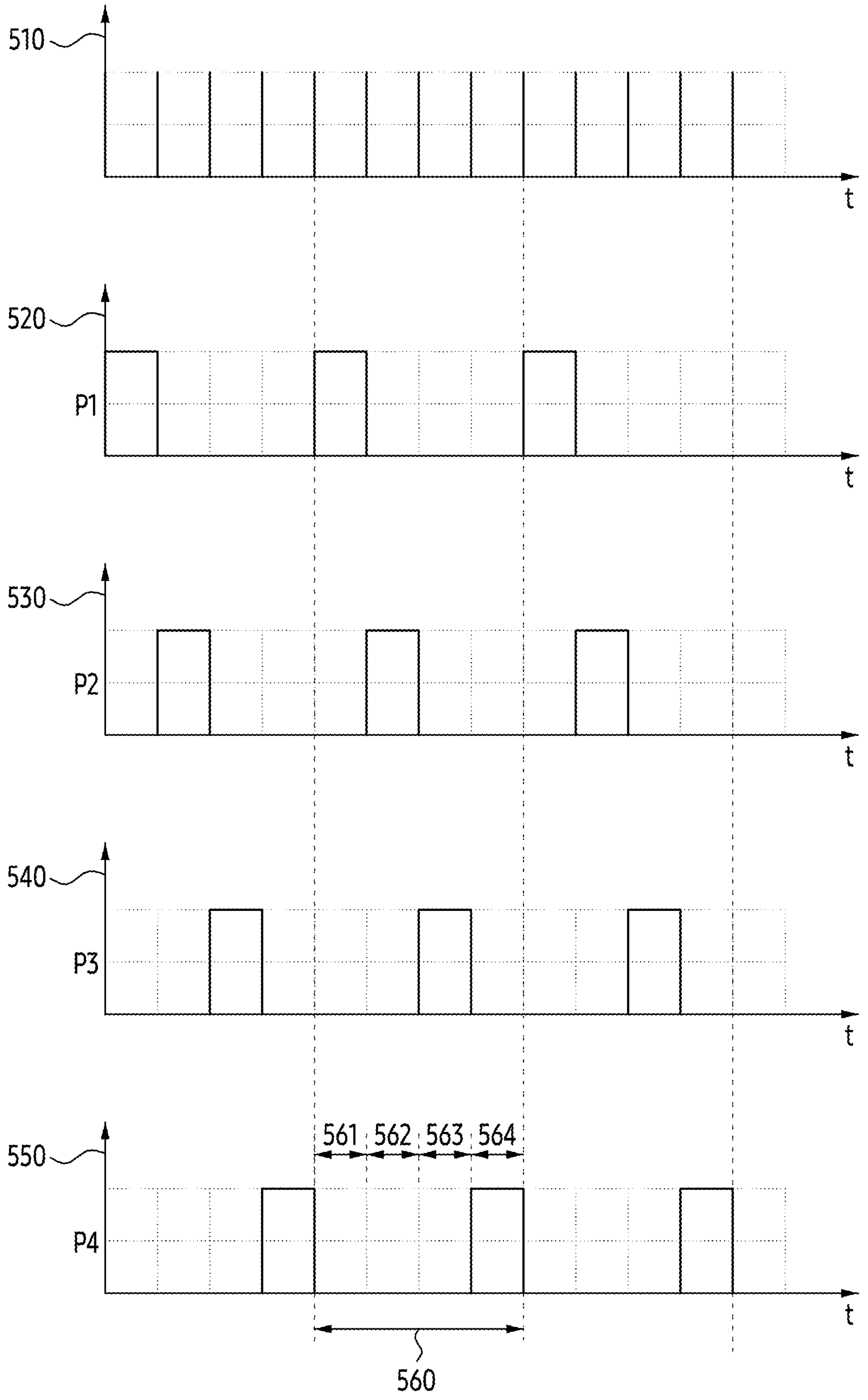
FIG. 5 is a timing diagram showing operations of a timing controlling unit and a power driving unit of a display device according to an embodiment.

FIG. 5 is a timing diagram explaining operations of a timing controlling unit and a power driving unit of a display device according to an embodiment of this disclosure. The display device of FIG. 5 may be an example of the display device 101 of FIGS. 1A and 1B. For example, the timing controlling unit and the power driving unit may include each of the timing controlling unit 210 and the power driving unit 220 of FIGS. 2 to 4.

Referring to FIG. 5, according to an embodiment, graphs 510, 520, 530, 540, and 550 of signals generated in the backlight panel (e.g., the backlight panel 154 of FIGS. 1A and 1B, and/or FIG. 2) of the display device are shown along a coincident time axis. The graph 510 illustrates signals (e.g., signals 330 and 430 of FIG. 3 and/or FIG. 4) transmitted from the timing controlling unit of the backlight panel to the power driving unit. Hereinafter, it is assumed that the power driving unit is connected to four power lines to sequentially activate four power lines. Referring to FIG. 5, each of the graphs 520, 530, 540, and 550 may indicate a magnitude of a power signal transmitted from each of the first to fourth power lines connected to the power driving unit.

As described above, according to an embodiment, the power driving unit may sequentially transmit a power signal to a plurality of power lines according to a preset period. Cycle 560 of FIG. 5 illustrates a time section in which the power driving unit activates all of a plurality of power lines based on a preset period. The duration of the cycle 560 may be less than the duration of a frame in which the display panel (e.g., the display panel 152 of FIGS. 1A and 1B) disposed on the backlight panel displays a single video. In an embodiment, the duration of the cycle 560 may be set to a relatively short duration less than the duration of the frame to prevent flickering by the backlight panel. For example, when the frame rate of the display panel is 120 fps, the duration of the frame may be 1/120≈8.33 ms, and the duration of the cycle 560 may be 8.33 ms×1/100=83.3 μs, which is shorter than the duration of the frame.

According to an embodiment, the timing controlling unit of the backlight panel may transmit a signal for switching the power line activated by the power driving unit to the power driving unit. Referring to the graph 510 of FIG. 5, a signal transmitted by the timing control unit to the power driving unit may have a voltage and/or a current that periodically changes at a predetermined period. In each of the time sections 561, 562, 563, and 564 within the cycle 560 distinguished by the signal of graph 510, different LEDs on the backlight panel may be activated. For example, the pixel controlling unit connected to four LEDs may sequentially activate the four LEDs in each of the time sections 561, 562, 563, and 564. In the above example, in each of the time sections 561, 562, 563, and 564, the pixel controlling unit may maintain the intensity of any one of the four LEDs as an intensity corresponding to the pulse-width of the pulse signal received from the source driving unit. In the above example, in each of the time sections 561, 562, 563, and 564, the pixel controlling unit may maintain a color of any one of the four LEDs as a color corresponding to the amplitude of the pulse signal received from the source driving unit.

According to an embodiment, the timing controlling unit of the backlight panel may control a source driving unit and/or a gate driving unit included in the backlight panel based on a preset period indicated by graph 510. For example, the source driving unit and the gate driving unit may input intensities of LEDs connected to an activated power line to each of the plurality of pixel controlling units based on a preset period indicated by graph 510. Based on the input intensities of the LEDs, the pixel controlling unit may maintain the intensity of the LED connected to the activated power line during a preset duration (e.g., the duration of each of the time sections 561, 562, 563, and 564).

Although an embodiment in which a display device includes a single backlight panel has been described, the embodiments described herein are not limited thereto. Hereinafter, referring to FIG. 6, an embodiment in which a display device includes a plurality of backlight panels will be described.

Figure 6:
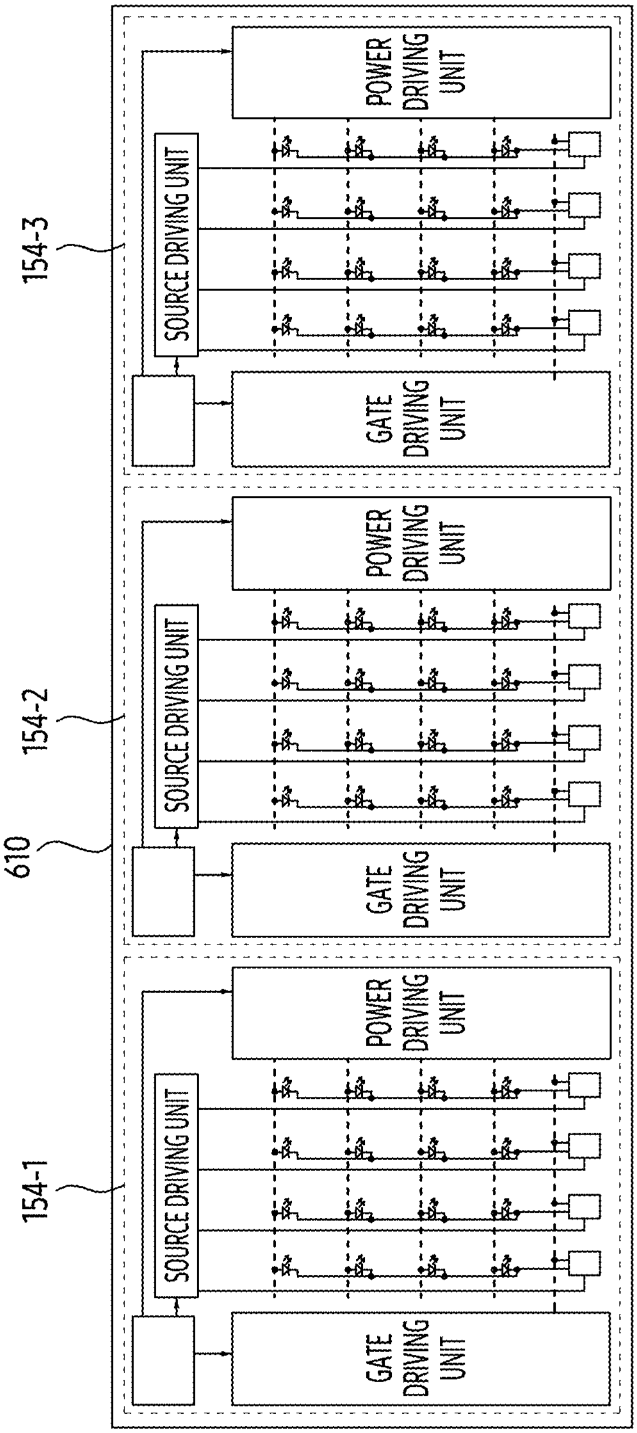
FIG. 6 is an exemplary view of a plurality of backlight panels disposed toward a display panel of a display device according to an embodiment.

FIG. 6 is an exemplary view of a plurality of backlight panels 154-1, 154-2, and 154-3 disposed toward a display panel of a display device according to an embodiment. The display device of FIG. 6 may be an example of the display device 101 of FIGS. 1A and 1B. For example, each of the backlight panels 154-1, 154-2, and 154-3 of FIG. 6 may be an example of the backlight panel 154 of FIGS. 1A and 1B and/or FIG. 2.

Referring to FIG. 6, backlight panels 154-1, 154-2, and 154-3 disposed at different portions of the display area 610 of the display panel (e.g., the display panel 152 of FIGS. 1A and 1B) included in the display device are illustrated. Although an example based on the three backlight panels 154-1, 54-2, and 154-3 is illustrated, the embodiment is not limited thereto. The display device may include a different number of backlight panels based on the size of the display area 610 and/or the backlight panels 154-1, 154-2, and 154-3. For example, the number of backlight panels included in the display device may be determined based on a ratio between the size of the display area 610 and the size of the backlight panel.

Referring to FIG. 6, the backlight panels 154-1, 154-2, and 154-3 may be disposed at different portions of the display area 610 to emit light toward the display panel. The display device may transmit at least a portion of a video to be displayed in the display area 610 in the frame to the backlight panels 154-1, 154-2, and 154-3 at every frame. Each of the backlight panels 154-1, 154-2, and 154-3 may adjust the intensities of LEDs included in the backlight panel based on a portion of a video corresponding to a portion of the display area 610 in which the backlight panel is disposed. Adjusting the intensities of the LEDs by the backlight panels 154-1, 154-2, and 154-3 may be performed within a frame, substantially simultaneously, or independently.

Figure 7:
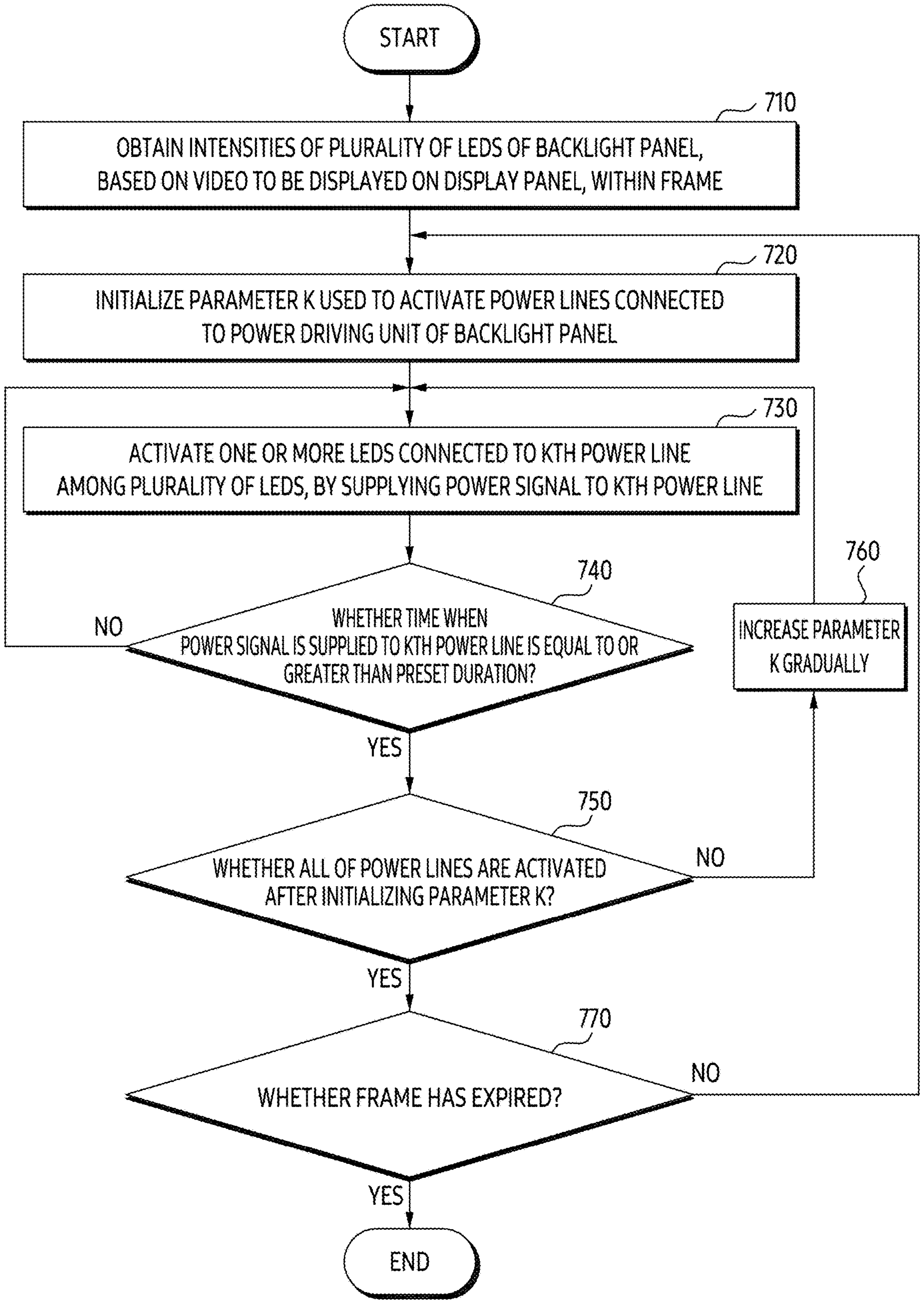
FIG. 7 shows an example of operation of a backlight panel of a display device according to an embodiment.

FIG. 7 shows an example of operation of a backlight panel of a display device according to an embodiment. The display device of FIG. 7 may be an example of the display device 101 of FIGS. 1A and 1B. According to an embodiment, the operations of FIG. 7 may be performed by a backlight panel (e.g., the backlight panel 154 of FIGS. 1A and 1B) of the display device, the timing controlling unit (e.g., the timing controlling unit 210 of FIGS. 2 to 4) of the backlight panel and/or the power driving unit (e.g., the power driving unit 220 of FIGS. 2 to 4) of the backlight panel.

Referring to FIG. 7, in operation 710, the timing controlling unit of the backlight panel according to an embodiment may obtain intensities of a plurality of LEDs of the backlight panel, based on a video to be displayed on the display panel, within a frame. The timing controlling unit may obtain information related to a video to be displayed on the display panel (e.g., the display panel 152 of FIGS. 1A and 1B) during a frame from the display panel superimposed at least partially on the backlight panel, and/or the GPU (e.g., GPU 114 in FIG. 1A) of the display device. Based on the obtained information, the timing controlling unit may obtain intensities of a plurality of LEDs of the backlight panel and/or colors.

Referring to FIG. 7, in operation 720, according to an embodiment, the timing controlling unit of the backlight panel may initialize a parameter k used to activate the power lines connected to the power driving unit of the backlight panel. The parameter k is a numerical value stored in the memory (e.g., register) of the timing control unit and/or the power driving unit, and may be a counter that gradually increases and/or decreases based on the number of power lines. For example, when the backlight panel includes N power lines, the parameter k may indicate one of integers respectively representing each of the N power lines. The parameter k may be used to select a specific power line to transmit a power signal from among N power lines. For example, the parameter k may be an identifier uniquely assigned to each of the power lines. In the above example, based on operation 720, the parameter k may be set to an integer (e.g., 0 or 1) assigned to the first power line among N power lines.

Referring to FIG. 7, in operation 730, according to an embodiment, the timing controlling unit of the backlight panel may activate one or more LEDs connected to the kth power line among a plurality of LEDs by controlling the power driving unit and supplying the power signal to the kth power line. The timing controlling unit may request the power driving unit to transmit a power signal to the kth power line using the signals 330 and 430 of FIGS. 3 to 4. In operation 730, according to an embodiment, the timing controlling unit may input intensities of the one or more LEDs to one or more pixel controlling units corresponding to the one or more LEDs activated by the kth power line using a source driving unit of the backlight panel (e.g., source driving unit 250 of FIGS. 2 to 4) and/or a gate driving unit (e.g., the gate driving unit 260 of FIGS. 2 to 4). As the one or more pixel controlling units adjust the intensity of the corresponding LED to the input intensity, light may be emitted toward the display panel.

Referring to FIG. 7, in operation 740, according to an embodiment, the timing control unit of the backlight panel may identify whether the time when the power signal is supplied to the kth power line is equal to or greater than a preset duration. The preset duration is an upper bound set to supply the power signal to the kth power line, and may correspond to period of each of the time sections 561, 562, 563, and 564 of FIG. 5. When the time of supplying the power signal to the kth power line is less than a preset duration (740—NO), the timing controlling unit may maintain activating one or more LEDs connected to the kth power line based on operation 730. For example, based on the operations 730 and 740, emitting light by one or more LEDs connected to the kth power line may be maintained for a preset duration.

In operation 750, according to an embodiment, in response to identifying that the time at which the power signal is supplied to the kth power line is greater than or equal to a first preset duration (740—YES), the timing controlling unit of the backlight panel may identify whether all of the power lines are activated based on operation 730 after initializing the parameter k based on operation 720. For example, after operation 720, the timing controlling unit may identify whether the time as long as the cycle 560 of FIG. 5 has elapsed. In operation 760, according to an embodiment, when all the power lines are not activated (750—NO), the timing controlling unit of the backlight panel may gradually increase the parameter k. For example, the timing controlling unit may repeatedly perform operations 730, 740, and 750 based on the increased parameter k. As the parameter k gradually increases based on operation 760, the parameter k may be increased up to an integer (e.g., N−1 or N) assigned to the Nth power line among N power lines included in the backlight panel.

In operation 770, according to an embodiment, in response to identifying that all of the power lines have been activated by a gradual increase in parameter k after operation 720 (750—YES), the timing controlling unit of the backlight panel may identify whether the frame of operation 710 has expired. For example, a preset duration of operation 740 is a duration less than a frame, and all power lines may be set to be repeatedly activated a plurality of times (e.g., dozens to hundreds of times). When the frame has not expired (770—NO), the timing controlling unit may repeatedly perform operations 730, 740, 750, and 760 after initializing the parameter k based on operation 720. In response to identifying that the frame expires (770—YES), adjusting the intensities of a plurality of LEDs within a single frame may be completed. After the frame expires, for the next frame after operation 710, the timing controlling unit may perform at least one of the operations of FIG. 7.

As described above, according to an embodiment, the backlight panel may simultaneously activate a plurality of LEDs based on an active matrix method. The plurality of LEDs simultaneously activated may be connected to each of a plurality of pixel controlling units, and may be commonly connected to a specific power line among a plurality of power lines of the power driving unit. According to an embodiment, the power driving unit may activate a plurality of LEDs included in the backlight panel based on time division by sequentially transmitting power signals to a plurality of power lines. Each of a plurality of pixel controlling units included in the backlight panel may maintain an intensity of an LED connected to a specific power line activated within a specific time section as an intensity received from the source driving unit.

As described above, according to an embodiment, a display device may comprise a backlight unit including a plurality of LEDs (Light Emitting Diodes). The display device may comprise a pixel controlling unit connected to, among the plurality of LEDs, LEDs arranged in a first direction. The display device may comprise a power driving unit which sequentially activates the LEDs connected to the pixel controlling unit by using a plurality of lines arranged in a second direction different from the first direction. The display device may comprise a source driving unit which transmits, to the pixel controlling unit, intensities of the LEDs connected to the pixel controlling unit. The display device may comprise a timing controlling unit for controlling the power driving unit and the source driving unit based on synchronized time sections. The pixel controlling unit may be configured to adjust, in a first time section among the time sections, an intensity of a first LED based on a first intensity received from the source driving unit, wherein the first LED, among the LEDs connected to the pixel controlling unit, is connected to a first line which is activated by the power driving unit among the plurality of lines. The pixel controlling unit may be configured to adjust, in a second time section different from the first time section among the time sections, an intensity of a second LED based on a second intensity received from the source driving unit, wherein the second LED, among the LEDs connected to the pixel controlling unit, is connected to a second line which is activated by the power driving unit among the plurality of lines.

For example, the backlight unit further may comprise other LEDs which are separated, respectively from the plurality of LEDs arranged in the first direction on a surface of the display device, in a second direction perpendicular to the first direction. The display device may further comprise another pixel controlling unit connected to the other LEDs. The other pixel controlling unit may be configured to adjust, in the first time section, an intensity of a third LED based on a third intensity received from the source driving unit, wherein the third LED among the other LEDs is connected to the first line. The other pixel controlling unit may be configured to adjust, in the second time section, an intensity of a fourth LED based on a fourth intensity received from the source driving unit, wherein the fourth LED among the other LEDs is connected to the second line.

For example, the source driving unit may be configured to transmit a signal indicating at least one of the first intensity or the second intensity to the pixel controlling unit by using a first source line connected to the pixel controlling unit. The source driving unit may be configured to transmit a signal indicating at least one of the third intensity or the fourth intensity to the other pixel controlling unit by using a second source line. The display device may further comprise a gate driving unit which notifies a moment when the pixel controlling unit and the other pixel controlling unit receive at least one of the first intensity, the second intensity. The third intensity, or the fourth intensity from the source driving unit by using a gate line connected both of the pixel controlling unit and the other pixel controlling unit. The timing controlling unit may control the gate driving unit based on the synchronized time sections.

For example, the timing controlling unit may be configured to transmit information indicating intensities of the plurality of LEDs and the other LEDs included in the backlight unit to the source driving unit.

For example, the source driving unit may be configured to sequentially apply pulse signals to the first source line and the second source line according to a preset period in the first time section. The pulse signals applied to the first source line may indicate, based on at least one of a pulse width or an amplitude, the first intensity which is an intensity of the first LED in the first time section.

For example, the pixel controlling unit may be configured to maintain the intensity of the first LED in the first time section, based on the pulse signals applied to the first source line, as the first intensity.

For example, the source driving unit may be configured to adjust an intensity of at least one of the plurality of LEDs or the other LEDs by using a source line connected to both of the pixel controlling unit and the other pixel controlling unit. The display device may further comprise a gate driving unit which notifies a moment for adjusting an intensity of at least one of the plurality of LEDs or the other LEDs by using a first gate line connected to the pixel controlling unit and a second gate line connected to the other pixel controlling unit. The timing controlling unit may be configured to control the gate driving unit based on the synchronized time sections.

For example, the gate driving unit may be configured to sequentially apply control signal to the first gate line and the second gate line according to the preset period in the first time section. The pixel controlling unit may be configured to obtain the first intensity indicating an intensity of the first LED based on at least one of a pulse width or an amplitude of a pulse signal received in the second node via the source line while the control signal is applied to the first gate line.

For example, the display device may further comprise a display panel which displays video based on a frame, and is superimposed on the plurality of LEDs on a surface of the display device where the plurality of LEDs are disposed. A duration of a cycle when LEDs connected to the pixel controlling unit are activated according to the synchronized time sections may be shorter than a duration of the frame.

For example, the first intensity of the first LED controlled by the pixel controlling unit in the first time section may be associated with at least one of intensity or color of portions of the video displayed corresponding to the first LED.

As described above, according to an embodiment, a method of a display device may comprise transmitting a power signal, by controlling a power driving unit connected to power lines connected to a plurality of LEDs included in the display device, to a first power line among the power lines. The method of the display device may comprise transmitting a control signal, while transmitting the power signal to the first power line, to plurality of pixel controlling units respectively connected to first LEDs among the plurality of LEDs which are connected to the first power line, wherein the control signal indicates intensities of each of the first LEDs. The method of the display device may comprise transmitting the power signal, in response to identification of an expiration of a preset duration after transmitting the power signal to the first power line, to a second power line different from the first power line by controlling the power driving unit, wherein the second power line is connected to second LEDs among the plurality of LEDs different from the first LEDs. The intensities of the first LEDs may be maintained as intensities indicated by the controlling signal in the preset period as the control signal is transmitted to the plurality of pixel controlling units.

For example, the transmitting the control signal may comprise transmitting, to the plurality of pixel controlling units, the control signal which respectively indicates intensities of the first LEDs based on at least one of a pulse width or an amplitude of a pulse signal having another duration shorter than the preset duration by controlling the source driving unit connected to the plurality of pixel controlling units. The transmitting the control signal may comprise transmitting a timing signal, to the plurality of pixel controlling units by controlling a gate driving unit connected to the pixel controlling units, for notifying a portion of the pixel controlling units corresponding to the plurality of pixel controlling units among portions of the control signal distinguished by the other period.

For example, the transmitting the control signal may further comprise transmitting the control signal to the plurality of pixel controlling units by using a plurality of source lines which respectively connect the source driving unit to the plurality of pixel controlling units.

For example, the transmitting the timing signal may further comprise transmitting the timing signal to the plurality of pixel controlling units by using a plurality of gate lines which respectively connect the gate driving unit to the plurality of pixel controlling circuits.

For example, a method of the display device may further comprise identifying video to be displayed in a displaying area formed by a display panel superimposed on the plurality of LEDs. The method of the display device may further comprise obtaining intensities of the plurality of LEDs during a frame when the video is displayed, based on at least one of intensity or color of portions of the video respectively corresponding to portions of the displaying area corresponding to each of the plurality of LEDs. The method of the display device may further comprise transmitting the control signal further comprises, transmitting the control signal indicating intensities of the first LEDs, based on obtained intensities of the plurality of LEDs, and the preset duration included in the frame.

As described above, according to an embodiment, a display device may comprise a plurality of LEDs disposed on a surface of the display device. The display device may comprise a plurality of pixel controlling units for respectively control groups of the plurality of LEDs. Each of the groups may include LEDs among the plurality of LEDs displaced along a first direction, and be separated along a second direction perpendicular to the first direction. The display device may comprise a source driving unit which transmit a first signal indicating an intensity of one of the plurality of LEDs, to at least one of the plurality of pixel controlling unit, based on a plurality of source lines respectively connected to the plurality of pixel controlling units and formed on the surface along the first direction. The display device may comprise a gate driving unit which transmit a second signal for maintaining an intensity indicated by the first signal during a preset duration based on a gate line, wherein the gate line is formed on the surface along the second direction and respectively connected to the plurality of pixel controlling circuits. The display device may comprise a power driving unit sequentially which activates, based on the preset duration, LEDs included in the groups based on a plurality of power lines, wherein the plurality of power lines are formed on the surface along the second direction and are separated to each other along the first direction.

For example, the power driving unit may be configured to transmit a power signal to a first power line among the plurality of power lines in a first time section having the preset duration. The source driving unit may be configured to transmit the first signal indicating intensities of one or more LEDs among the plurality of LEDs receiving the power signal via the first power line by using the plurality of source lines in the first time section.

For example, the power driving unit may be configured to transmit the power signal to a second power line among the power lines in a second time section different from the first time section and having the preset duration. The source driving unit may be configured to transmit the first signal indicating intensities of one or more other LEDs among the plurality of LEDs receiving the power signal via the second power line in the second time section.

For example, the display device may further comprise a timing controlling unit which synchronize the power driving unit, the source driving unit, and the gate driving unit based on the preset duration.

For example, the display device may further comprise a display panel which displays a video based on a frame, and is superimposed on the plurality of LEDs on a surface of the display device where the plurality of LEDs are displaced. A duration of a cycle when LEDs included in each of the groups are sequentially activated according to the preset duration may be shorter than a duration of the frame.

The devices described heretofore may be implemented as hardware components, or software components, and/or a combination of the hardware components and the software components. For example, the devices and components described in the embodiments may be implemented using one or more general-purpose or special-purpose of computers, such as e.g., a processor, a controller, an arithmetic logic unit (ALU), a digital signal processor (DSP), a microcomputer, a field programmable gate array (FPGA), a programmable logic unit (PLU), a microprocessor, or any other device capable of executing and responding to instructions. A processing unit/device may execute an operating system (OS) and one or more software applications running on the operating system. Further, the processing unit may access, store, manipulate, process, and generate data in response to execution of the software. For convenience of understanding, although it is sometimes described that a single processing unit is used, one of ordinary knowledge in the art will appreciate that the processing unit may include a plurality of processing elements and/or plural types of such processing elements. For example, the processing unit may include multiple processors or a single processor and at least one controller. Other processing configurations may be also possible, such as a parallel processor.

The software may include computer programs, codes, instructions, or a combination of one or more of the same, and configure a processing unit to operate as desired or command the processing unit independently or collectively. The software and/or data may be embodied in any type of machine, component, physical device, computer storage medium or device for interpretation by the processing unit or providing instructions or data to thereto. The software may be distributed over networked computer systems and stored or executed in a distributed manner. Software and data may be stored in one or more computer-readable recording media.

A method according to various embodiments may be implemented in the form of program instructions that can be executed through various computer means and recorded in a computer-readable medium. In this instance, the medium may be to continuously store the computer-executable program, or to temporarily store the program for execution or download. Further, the medium may be various recording means or storage means in the form of a single or several hardware combined together, which is not limited to a medium directly connected to any computer system and may exist distributed over a network. Examples of the recording media may include a magnetic medium such as e.g., a hard disk, a floppy disk and a magnetic tape, an optical recording medium such as e.g., compact disc read only memory (CD-ROM) and digital versatile disc (DVD), a magneto-optical medium such as e.g., a floptical disk, and those configured to store program instructions, such as e.g., ROM, RAM, flash memory, and the like. In addition, examples of other recording media may include recording media or storage media managed by an app stores distributing applications, websites supplying or distributing various other software, and servers.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., CD-ROM, DVD, a universal serial bus (USB) drive, or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

A computer-readable storage medium may be provided in the form of a non-transitory storage medium that stores executable instructions of a computer program product. Here, the term 'non-transitory' simply means that the storage medium is a tangible device, and does not include a signal, but this term does not differentiate between where data is semi-permanently stored in the storage medium and where the data is temporarily stored in the storage medium. For example, the non-transitory storage medium may include a buffer in which data is temporarily stored.

As described above, although the exemplary embodiments have been described with reference to some limited embodiments and drawings, various modifications and changes may be made from the above description by those skilled in the art. For example, although the techniques described above are performed in an order different from the described methods, and/or the elements such as the described system, structure, apparatus, circuit, etc. are coupled or combined in a different form than the described method, and/or replaced or substituted by other components or equivalents thereof, an appropriate result can be achieved.

Therefore, any other implementations, alternative embodiments, and/or equivalents to those claims will fall within the scope of the following claims.

What is claimed is:

1. A display device comprising:

backlight circuitry including a plurality of light emitting diodes (LEDs) arranged in first lines parallel to each other and second lines, wherein the second lines are perpendicular to the first lines, and are parallel to each other;

a set of pixel controlling circuits respectively corresponding to the first lines, wherein each pixel controlling circuit is directly connected to cathodes of LEDs disposed in a corresponding first line among the plurality of LEDs;

power driving circuitry including a plurality of power lines, wherein each of the plurality of power lines is respectively connected to LEDs, among the plurality of LEDs, which are disposed in each of the second lines;

gate driving circuitry including a plurality of gate lines connected to each pixel controlling circuit included in the set; and source driving circuitry including a source line connected to the set of pixel controlling circuits, wherein a brightness of each of LEDs, among the plurality of LEDs, which are disposed in a line among the second lines, is controlled by a corresponding pixel controlling circuit receiving signals from the source driving circuitry, while power is provided through a corresponding power line from the power driving circuitry to each of the LEDs disposed in the line.

2. The display device of claim 1, wherein the power driving circuitry is configured to sequentially provide the power to each of the plurality of power lines according to a preset period.

3. The display device of claim 1, further comprising:

timing controlling circuitry configured to control the power driving circuitry to supply the power to one of the plurality of power lines.

4. The display device of claim 3, wherein the timing controlling circuitry is further configured to:

supply the power to one of the plurality of power lines indicated by a parameter corresponding to one of the identifiers respectively assigned to the plurality of power lines, wherein the parameter is changed among the identifiers according to a preset period.

5. The display device of claim 1, wherein the gate driving circuitry is further configured to:

sequentially apply the signals to each of the plurality of gate lines, and wherein each of the signals has at least one pulse indicating a moment at which a corresponding pixel controlling circuit receives a signal from the source line.

6. The display device of claim 1, wherein each pixel controlling circuit included in the set is further configured to maintain brightness of each of the LEDs disposed in the line while the power is provided.

7. The display device of claim 1, wherein the source driving circuitry is further configured to transmit, through the gate line, a signal including one or more pulses of which a pulse width or an amplitude indicates an intensity of each of LEDs which are disposed in the line.

8. The display device of claim 1, wherein the power driving circuitry is further configured to sequentially provide the power to the plurality of power lines based on a preset duration, to illuminate the LEDs in one of the second lines in each of time sections distinguished by the preset duration.

9. The display device of claim 1, further comprising:

a display panel configured to display video based on a frame, and is positioned on a surface of the display device where the plurality of LEDs are disposed, and wherein a duration of a cycle when the plurality of LEDs are activated is shorter than a duration of the frame.

10. The display device of claim 9, wherein the brightness of each of the LEDs in the line is associated with at least one of an intensity or a color of a portion of the video displayed on the display panel.

11. A method of a display device, comprising:

by controlling power driving circuitry connected to a plurality of power lines, wherein the plurality of power lines are connected to a plurality of LEDs included in the display device, transmitting a power signal to a first power line among the plurality of power lines, wherein the plurality of power lines are parallel to each other, wherein the plurality of LEDs are arranged in first lines respectively corresponding to each of the plurality of power lines and are arranged in second lines which are perpendicular to the first lines and are parallel to each other;

while transmitting the power signal to the first power line, transmitting, to a set of pixel controlling circuits respectively connected to first LEDs which are connected to the first power line among the plurality of LEDs, through a source line connected to the set of pixel controlling circuits, a first control signal indicating intensities of each of the first LEDs, wherein the pixel controlling circuits respectively correspond to the second lines, wherein each pixel controlling circuit is directly connected to cathodes of LEDs disposed in a corresponding second line among the plurality of LEDs;

upon expiration of a preset duration after transmitting the power signal through the first power line, transmitting, to a second power line different from the first power line, the power signal, wherein the second power line is connected to second LEDs among the plurality of LEDs different from the first LEDs; and while transmitting the power signal to the second power line, transmitting, to the set of pixel controlling circuits, through the source line, a second control signal indicating intensities of each of the second LEDs, and wherein the intensities of the first LEDs are maintained as intensities indicated by the first control signal in the preset duration.

12. The method of claim 11, wherein the transmitting the first control signal comprises:

transmitting the first control signal indicating the intensities of the first LEDs based on at least one of a pulse width or an amplitude of pulses; and transmitting, to the set of pixel controlling circuits, timing signals indicating a moment at which a corresponding pixel controlling circuit receives the first control signal.

13. The method of claim 12, wherein the transmitting the timing signals comprises:

transmitting the timing signals respectively to gate lines connected to each of the set of pixel controlling circuits.

14. The method of claim 12, wherein the transmitting the first control signal comprises:

transmitting the first control signal including pulses respectively indicating the intensities of each of the first LEDs.

15. The method of claim 11, further comprising:

identifying video to be displayed on a display area of a display panel which is positioned on the plurality of LEDs; and obtaining intensities of the plurality of LEDs during a frame of the video, based on at least one of an intensity or a color of portions of the frame respectively corresponding to portions of the display area corresponding to each of the plurality of LEDs, and wherein the transmitting the first control signal further comprises:

transmitting the first control signal, in a preset duration included in the frame, indicating intensities of the first LEDs based on the obtained intensities respectively corresponding to the first LEDs.

16. A display device comprising:

a plurality of LEDs disposed on a surface of the display device, wherein the plurality of LEDs are arranged in first lines parallel to each other, and second lines, wherein the second lines are perpendicular to the first lines and are parallel to each other;

a set of pixel controlling circuits respectively corresponding to the first lines, the set of pixel controlling circuits configured to control respective groups of the plurality of LEDs, wherein each of the groups includes LEDs disposed in each of the first lines among the plurality of LEDs, wherein each pixel controlling circuit is directly connected to cathodes of LEDs disposed in a corresponding first line among the plurality of LEDs;

source driving circuitry configured to transmit a first signal to the set of pixel controlling circuits through a source line connected to the set of pixel controlling circuits;

gate driving circuitry configured to transmit second signals for maintaining an intensity indicated by the first signal during a preset duration through gate lines connected to each pixel controlling circuit; and power driving circuitry including a plurality of power lines, wherein each of the plurality of power lines respectively connected to the LEDs disposed in each of the second lines.

17. The display device of claim 16, wherein the power driving circuitry is configured to:

transmit a power signal to a first power line among the plurality of power lines in a first time section having the preset duration.

18. The display device of claim 17, wherein the source driving circuitry configured to:

transmit the first signal indicating intensities of LEDs disposed in a line of the second lines corresponding to the first power line in the first time section.

19. The display device of claim 16, further comprising:

timing controlling circuitry configured to synchronize the power driving circuitry, the source driving circuitry, and the gate driving circuitry based on the preset duration.

20. The display device of claim 16, further comprising:

a display panel configured to display video based on a frame, wherein the display panel is positioned on a surface of the display device where the plurality of LEDs are disposed, and wherein a duration of a cycle when the plurality of LEDs are activated is shorter than a duration of the frame.

* * * * *